Patented Aug. 1, 1939

2,168,230

UNITED STATES PATENT OFFICE 2,168,230

CERAMIC BODY AND METHOD OF MAKING THE SAME

Samuel J. McDowell, Metuchen, N. J., assignor to General Ceramics Company, a corporation of New Jersey No Drawing. Application September 2, 1937, Serial No. 162,134

13 Claims. (Cl. 106—11)

This invention relates to a ceramic body and the method of making the same and, more particularly, is directed to an improved ceramic insulator.

Electrical insulators of ceramic material, especially steatite, are in common use today. Insulators of this material possess many good characteristics and advantages well known to the art. However, when used in radio and other high frequency work they have the disadvantage of a relatively high dielectric power factor, this power factor at 1,000 kilocycles being approximately .2%.

It is an object of this invention to produce a ceramic body having an extremely low dielectric power factor.

A still further object of this invention is the production of an improved electrical ceramic insulator having a non-alkali metallic oxide as a vitrifying flux.

Other and additional objects and advantages of the present invention will be hereinafter described and particularly pointed out in the claims.

The ceramic steatite insulating body commonly made today consists of 70% or more of pulverized talc or soapstone of the general chemical formula, 3MgO—4SiO$_2$—H$_2$O. To this is generally added either a clay such as $$Al_2O_3—2SiO_2—2H_2O$$

or feldspar, K$_2$O—Al$_2$O$_3$—6SiO$_2$, or both. The latter material may, if desired, be replaced by a similar alkali ar alkaline earth mineral. The ceramic body is ground, filter pressed, formed and fired in ways familiar to the art.

In the above described method, the talc is used to give the resultant fired ceramic body the necessary strength and electrical properties which is a result of the formation under heat of firing of clino-enstatite (MgO—SiO$_2$). The clay is added to assist through its plasticity in forming the ware prior to firing and the feldspar, or similar alkali flux, is added to slowly form a glass during firing and give a long vitrification range.

The usual dielectric power factor of such a body described above at 1,000 kilocycles would be about .2%. This can be decreased within slight limits if the amount of feldspar or alkali is decreased. Such a power factor, while relatively low, causes excessive losses when used in high frequency electrical circuits.

In contrast to the present practice, I have found that a non-alkali flux may be used in place of the usual feldspar or similar alkali flux, which will not only form the necessary glass during firing but, moreover, will reduce the dielectric power factor to .05%, or less. In my improved ceramic insulator, no feldspar or alkalies are present whatsoever except as they may accidentally occur as impurities in the talc or other raw materials used.

Preferably, I have found that an oxide of antimony, more specifically, either the trioxide Sb$_2$O$_3$ or the pentoxide Sb$_2$O$_5$ produces excellent results as the flux, but I desire to point out at this time that this invention is not limited to these specific fluxes alone. If an antimony oxide is used as the flux it is in some cases advisable, due to the tendency of this oxide to volatilize, to incorporate it into a glass or fritt with other oxides, such as CaO, BaO, BeO, CoO, Al$_2$O$_3$, PbO, ZnO, SiO$_2$, or B$_2$O$_3$, or any suitable combination thereof.

As an example of the form my invention may take, the following composition is given as typical:

|  | Parts | Parts |
|---|---|---|
| Pulverized talc | 70–95 | for example about 80 |
| Non-alkali oxides such as antimony oxide | 1–10 | for example about 5 |
| Clay | 0–20 | for example about 15 |

In the manufacture of my novel low power factor ceramic body the present methods used in the art and described by way of example above, can be utilized with the difference, however, that instead of mixing feldspar or other alkali fluxes with the main body material, a non-alkali flux is substituted therefor and added in a similar manner.

While I have herein described only certain embodiments and features of my present invention, it is to be understood that they are to be regarded merely as illustrative and that I do not intend to limit myself thereto, except as may be required by the following claims.

I claim:

1. A fired ceramic body characterized by a dielectric power factor of not more than .05% comprising talc and non-alkali metallic oxides including antimony oxide.

2. A fired ceramic body characterized by a dielectric power factor of not more than .05% comprising talc and an oxide of antimony.

3. A fired ceramic body charactterized by a dielectric power factor of not more than .05% comprising talc, clay and an oxide of antimony.

4. A fired ceramic body comprising talc, and ground non-alkali glass, said ground glass containing at least 10% antimony oxide.

5. A fired ceramic body comprising at least 70% talc, and less than 30% clay and ground non-alkali glass, said ground glass containing at least 10% antimony oxide.

6. A fired ceramic body comprising at least 70% talc, and less than 30% clay and non-alkali metallic oxides, said oxides including at least 1% antimony oxide.

7. A fired ceramic body comprising at least 70% talc, and less than 30% non-alkali metallic oxides, said oxides containing at least 1% antimony oxide.

8. In a method of making a ceramic article, the principal constituent of which is steatite, the step of adding non-alkali metallic oxides including at least 1% antimony oxide to the mass as a flux.

9. In the method of making a ceramic article, the principal constituent of which is steatite, the step of adding an oxide of antimony to the mass as a flux.

10. A fired ceramic body having the following composition:

|  | Parts |
| --- | --- |
| Talc | 70–95 |
| Antimony oxide | 1–10 |
| Clay | 0–20 |

11. A fired ceramic body characterized by a dielectric power factor of not more than .05%, comprising talc, clay and ground non-alkali glass containing antimony oxide.

12. A fired ceramic body comprising at least 70% talc and less than 30% clay, non-alkali metallic oxides and ground non-alkali glass, said ground glass containing at least 10% antimony oxide.

13. A fired ceramic body characterized by a dielectric power factor of not more than .05%, comprising talc, non-alkali metallic oxides, and ground non-alkali glass containing antimony oxide.

SAMUEL J. McDOWELL.